US011873920B2

(12) United States Patent
Hettinga et al.

(10) Patent No.: US 11,873,920 B2
(45) Date of Patent: Jan. 16, 2024

(54) SAFETY DEVICE (71) Applicant: SHELL OIL COMPANY, Houston, TX (US)

(72) Inventors: Folkert Hettinga, Delft (NL); Peter Van Der Wagt, Breda (NL); Alfred Arnold Kruijer, Rijswijk (NL); Willem George Sied Van Rijs, Rijswijk (NL)

(73) Assignee: SHELL USA, INC., Houston, TX (US)

( * ) Notice: Subject to any disclaimer, the term of this patent is extended or adjusted under 35 U.S.C. 154(b) by 307 days.

(21) Appl. No.: 17/289,972

(22) PCT Filed: Oct. 21, 2019

(86) PCT No.: PCT/EP2019/078590
§ 371 (c)(1),
(2) Date: Apr. 29, 2021

(87) PCT Pub. No.: WO2020/088974
PCT Pub. Date: May 7, 2020

(65) Prior Publication Data
US 2022/0003333 A1 Jan. 6, 2022

(30) Foreign Application Priority Data
Oct. 31, 2018 (DE) ..................... 10 2018 218 642.1

(51) Int. Cl.
*F16K 35/16* (2006.01)
*F16K 31/04* (2006.01)
*F16K 31/56* (2006.01)

(52) U.S. Cl.
CPC .............. *F16K 35/16* (2013.01); *F16K 31/04* (2013.01); *F16K 31/56* (2013.01); *F16K 31/047* (2013.01)

(58) Field of Classification Search
USPC .......................................................... 251/69
See application file for complete search history.

(56) References Cited

U.S. PATENT DOCUMENTS

| 3,512,421 A * | 5/1970 | Anderson | ............... F16K 31/05 |
| | | | 251/71 |
| 3,518,891 A * | 7/1970 | Denkowski | ............. F16K 31/05 |
| | | | 251/71 |

(Continued)

FOREIGN PATENT DOCUMENTS

| DE | 29801229 U1 | 5/1998 |
| DE | 102007032327 B3 | 7/2008 |
| GB | 2383627 A | 7/2003 |

OTHER PUBLICATIONS

International Search Report and Written Opinion Received for PCT Application No. PCT/EP2019/078590, dated Jan. 22, 2020, 10 pages.

(Continued)

*Primary Examiner* — Robert K Arundale
(74) *Attorney, Agent, or Firm* — SHELL USA, INC.

(57) ABSTRACT

A safety device for detachably locking the output member of a linear drive has a coupling rod that can be coupled with the output element of the linear drive. A blocking unit is linearly movably penetrated by the coupling rod that is relatively movable with respect to the housing between a locking position blocking the stroke of the coupling rod and a release position enabling the linear movement of the coupling rod. A spring device prestresses the blocking unit in the blocking position and a locking device locks the blocking unit in the release position. The locking device has locking rolling elements in the housing and a support sleeve that is linearly movably penetrated by the coupling rod. When energized, an (Continued)

electromagnet device holds the support sleeve in the support position against the recoil force of at least one trigger spring of a trigger spring device.

29 Claims, 6 Drawing Sheets

(56) References Cited

U.S. PATENT DOCUMENTS

| | | | |
|---|---|---|---|
| 5,497,672 | A | 3/1996 | Appleford et al. |
| 5,984,260 | A * | 11/1999 | Rawson ................ F16K 31/047 |
| | | | 251/71 |
| 6,129,333 | A * | 10/2000 | Ma .......................... F16K 31/56 |
| | | | 251/71 |
| 7,992,457 | B2 * | 8/2011 | Hodnefjell ............ F16K 31/047 |
| | | | 74/89.39 |
| 8,550,118 | B2 | 10/2013 | Burmester |
| 9,464,728 | B2 | 10/2016 | Herrmann |
| 9,964,127 | B2 | 5/2018 | Burmester et al. |
| 10,247,326 | B2 | 4/2019 | Schupp et al. |
| 2013/0256570 | A1 | 10/2013 | Mchugh et al. |

OTHER PUBLICATIONS

Office Action Received for Indian Application No. 202147023599, dated Jan. 20, 2023, 6 Pages (6 Pages of Official Copy).
Office Action Received for Chinese Application No. 201980069136.9, dated Jul. 22, 2022, 10 Pages (5 Pages of English Translation and 5 Pages of Official Copy).

* cited by examiner

SAFETY DEVICE

CROSS REFERENCE TO RELATED APPLICATION

The present application is the National Stage (§ 371) of International Application No. PCT/EP2019/078590, filed Oct. 21, 2019, which claims priority of German Application Serial No. 10 2018 218 642.1, filed Oct. 31, 2018, which is incorporated herein by reference in its entirety.

FIELD OF THE INVENTION

The invention relates to a safety device for detachably locking the output member of a linear drive.

BACKGROUND OF THE INVENTION

Certain safety devices have been known for a long time and are used as fail-safe devices to hold the output member of a linear drive in cases of power failure, for example, to hold the spindle of a process valve in a defined position, in other words, to lock it there. In a process valve, such a defined position may be, for example, the open position or the closing position of a valve member coupled to the spindle.

For example, in DE 2007 032 327 B3, a valve positioning device having a safety function is disclosed, wherein a safety device is switched on between the drive of the process valve and the valve member. The safety device has an electromagnet that blocks a piston when energized, allowing the normal operation of the valve spindle for opening, closing and freely controlling (without a spring) of a through opening on a valve fitting by means of a valve member coupled to the spindle. In the event of a power failure, the electromagnet is deactivated, and the piston is blocked, which causes the valve spindle to move into a safety position, which in this case is the closed position, regardless of the position of the pistons.

SUMMARY OF THE INVENTION

The object of the invention is to provide a safety device for detachably locking the output member of a linear drive with the help of which the connected system can be transferred safely to a predefined safety state.

The safety device according to the invention for detachably locking the output member of a linear drive comprises:
- a coupling rod that is compatible with the output member of the linear drive,
- a housing which is linearly movably penetrated by the coupling rod,
- a blocking unit which is linearly movably penetrated by the coupling rod, which blocking unit is relatively movable with respect to the housing between a blocking position, which blocks the stroke of the coupling rod, and a release position, which allows the linear movement of the coupling rod.
- a spring device for prestressing the blocking means in the direction of the blocking position,
- a blocking device for locking the blocking unit in the release position, wherein the blocking device has locking rolling elements accommodated in the housing and a support sleeve which is linearly movably penetrated by the coupling rod, wherein the support sleeve is movable between a support position, in which the support rolling elements are held radially to the outside in locking engagement with the blocking unit, and a release position, allowing a retracting of the support rolling elements radially to the inside, out of the engagement with the blocking unit,
- an electromagnet device which, when energized, holds the support sleeve in the support position in the opposite position of the force of at least one trigger spring of a spring device, such that in the event of a power failure, the holding function can be reversed and the support sleeve is moved by means of at least one release spring into the release position whereby the blocking unit can be transferred to the blocking position by means of the spring device.

The safety device thus works on the basis of the cooperation of the electromagnet device with the locking device and the support rolling elements. In the release position, the blocking device is locked and inactive, such that the output member of the linear drive and the coupling rod connected to it are movable within their lifting range. In the event of a power failure, the blocking device triggers by removing the locking of the support rolling elements.

The spring device then brings the blocking device into the blocking position, in which the lifting movement of the coupling rod is blocked. The safety device works purely mechanically, i.e. electrical auxiliary energy or other non-electrical auxiliary energy, such as for example compressed air, is not necessary for the function of the safety device. This guarantees that the safety device works reliably in case of failure.

In the further development of the invention, a stop is formed at the coupling rod and a counter-stop is formed at the blocking unit, said stops being arranged in the release position with an axial distance to each other that determines the stroke of the coupling rod and which are attached to each other in the blocking position causing the blocking of the output member.

In a particularly preferred embodiment, the blocking unit has a blocking sleeve penetrated by the coupling rod, which supports the blocking rolling element in the release position radially to the outside and holds said blocking rolling element in the locking position.

Conveniently, the blocking sleeve has an annular receiving space, in which an assigned support rolling element is immersed in the locking position.

In a further development of the invention, a plurality of support rolling elements grouped around the circumference of the support sleeve is provided, each having at least one support rolling element. In a particularly preferred embodiment, the support rolling element groups each have a plurality of support rolling elements arranged successively in the radial direction. Thus, when releasing the locking device, the support rolling elements can be used to bring said support rolling elements into the blocking position, to roll past each other and thus allow a quick and technically easy to implement removal of the locking system. Furthermore, the support rolling elements of the respective support rolling element group can easily be brought into the locking position, whereby rolling past each other is no longer possible, thereby locking the blocking unit.

Conveniently, the support rolling elements of a respective support rolling element group are staggered on top of each other in the release position of the support sleeve in the height direction. The radial extension of the support rolling elements within a support rolling element group is greater in the locking position of the support sleeve, i.e. greater in the locking position than in the release position of the support sleeve, wherein the staggering in the height direction causes a reduction of the radial extension.

In a further development of the invention, the support sleeve has an external wall on which a support sleeve, which interacts with the receiving space of the blocking device in the locking position, is formed, in which a support roller element immerses in the blocking position.

In a particularly preferred embodiment, the support rolling elements are cylindrically formed. The support rollers can therefore be formed as rollers. Alternatively, however, it would also be conceivable to use spheres as rolling elements.

In a further development of the invention, the electromagnet device has several electromagnets grouped around the coupling rod, which, when energized, hold the support sleeve together in the support position.

In some embodiments, the electromagnets are each spring-loaded, in particular coupled on the underside with a recoil spring, which is compressed in the blocking position of the blocking unit and which, in the release position, moves said blocking unit out if its original position when deactivating the electromagnets, wherein an associated position sensor can detect a change in position.

In a particularly preferred manner, the release spring means has a plurality of release springs grouped around the coupling rod, which release springs move the support sleeve upon deactivation of the electromagnet device together into the release position. Conveniently, the trigger springs and the electromagnets are arranged in the circumferential direction offset to each other.

In a further development of the invention, the blocking sleeve has an inner sleeve section formed with the counterstop, which inner sleeve section surrounds the coupling rod concentrically and is immersed in an annular space between a cylindrical inner housing section and the coupling rod, and wherein the blocking sleeve has an outer sleeve section, which surrounds the inner housing section in a concentric manner, and wherein the receiving space for the blocking rolling elements is formed on the inner wall of said outer sleeve section.

In a particularly preferred manner, recoil agents are provided for returning the blocking unit against the spring force of the spring device from the blocking position into the release position. The recoil agents may have a mechanical, fluidic or electrical recoil drive for returning the blocking unit to the release position. For example, the recoil drive can be formed as a servo motor. However, other types of recoil drives are also possible, such as a hydraulic or pneumatic drive.

Some embodiments provide a damping device for damping the exit movement of the blocking unit from the blocking position into the release position when triggering the security function. Conveniently, the damper is designed as an oil damper. The damper conveniently has two oil chambers connected by a throttle, wherein hydraulic oil is displaced from one oil chamber to the other for triggering a damping function.

In a further development of the invention, a retaining device for retaining the support rolling elements against radial movement to the outside is provided in the blocking position of the blocking unit. Since the receiving space of the blocking sleeve is removed because the blocking unit was triggered and is in the release position, there is the need to hold back the support roller elements.

In a particularly preferred manner, the retaining device has a retaining element assigned, in particular, to the respective radially outer support rolling element of a respective support rolling element group, which outer support rolling element is movably arranged between a retaining position, retaining the assigned support roller elements, and a non-use position. Conveniently, the retaining member is spring-loaded and is supported by a recoil spring, which presses the retaining member such that it abuts the radially outer support rolling element in the release position of the support sleeve or in the release position of the blocking device.

Some embodiments of the invention further discloses a drive unit having a linear drive and a safety device, wherein the safety device is characterized according to any of claims 1 to 16.

Further, some embodiments of the invention comprise a valve, in particular a process valve, having a valve fitting and a drive unit, wherein the drive unit is formed according to claim 17.

BRIEF DESCRIPTION OF THE DRAWINGS

A preferred embodiment of the invention is shown in the drawings and is explained in more detail below, in which.

DETAILED DESCRIPTION OF THE INVENTION

FIG. 1 to FIG. 6 show a preferred embodiment of the safety device 11 according to the invention. The safety device 11 is in the exemplary case part of a valve (not shown), in particular of a process valve, and is switched on there between a valve drive in the form of a linear drive (not shown) and the valve fitting (not shown). The valve drive may be, for example, an electric or fluidic, in pneumatic linear drive. The linear drive has an output member (not shown), which, in the case of a fluid linear drive, can be the piston rod of a work cylinder, for example, which piston rod in turn is connected to a drive piston, which is moveable back and forth by fluid pressure operation in a cylinder housing.

The output member of the linear drive is coupled with a coupling rod 12, which is part of the safety device 11. The coupling rod 12 can also be called a spindle in the case of a process valve.

The valve also has a valve fitting (not shown), which can also be referred to as a valve housing. In the valve housing, a flow channel extends between an input and an output. In the flow channel, there is a flow opening between the input and the output, which is surrounded by a valve seat. A valve member is assigned to the valve seat, which again is connected to the coupling rod 12.

The valve member is movable by means of a stroke of the coupling rod 12 between a locking position, in which the valve member is fluid-tightly attached to the valve seat and an open position in which the valve member is lifted off the valve.

The stroke of the coupling rod 12 is generated by the valve drive.

The safety device 11 is therefore switched on in the exemplary case between the valve drive and the valve fitting.

Figure 1:
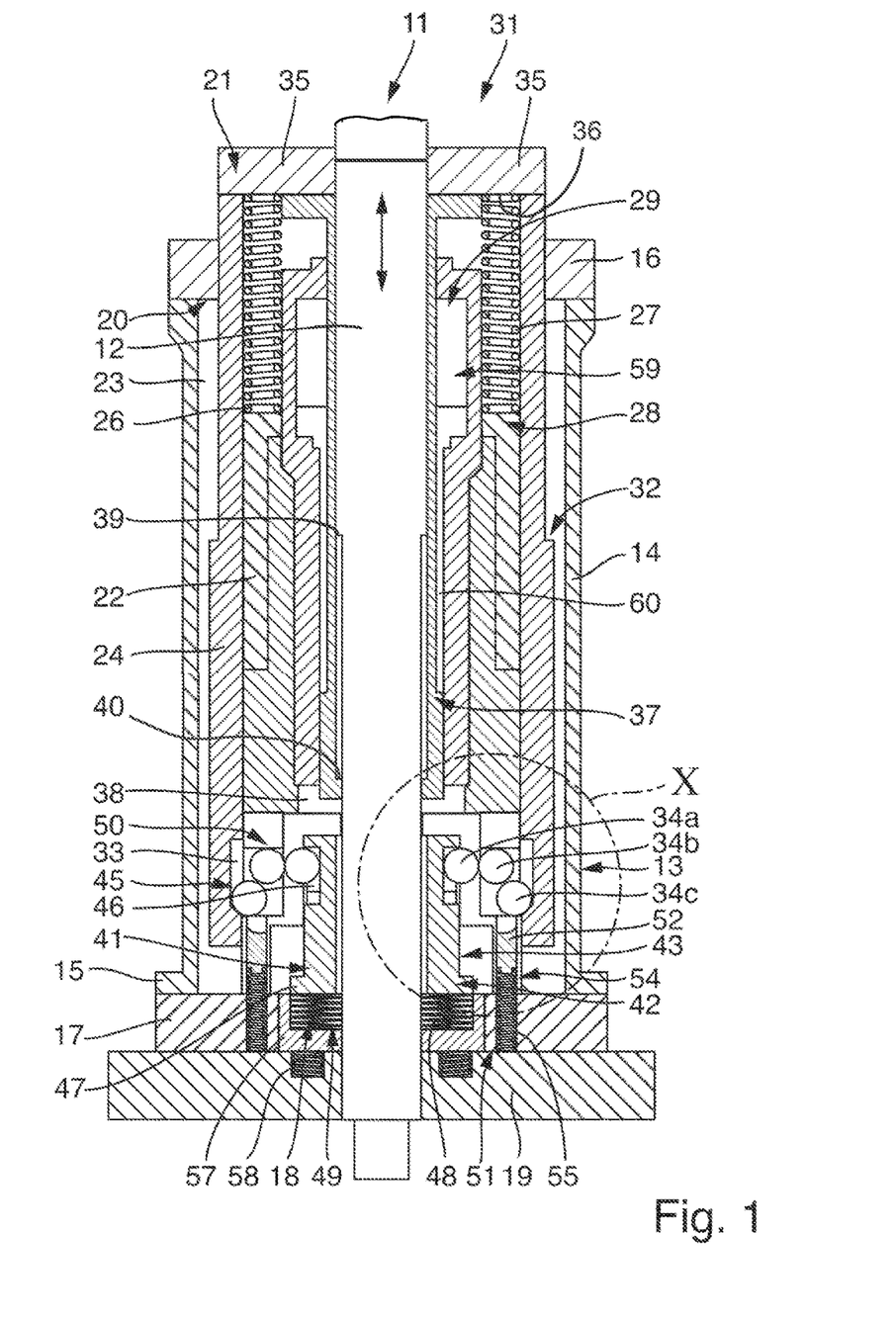
FIG. 1 shows a schematic representation of a preferred embodiment of the safety device according to the invention in the longitudinal section, wherein the blocking unit is in the release position.
Figure 2:
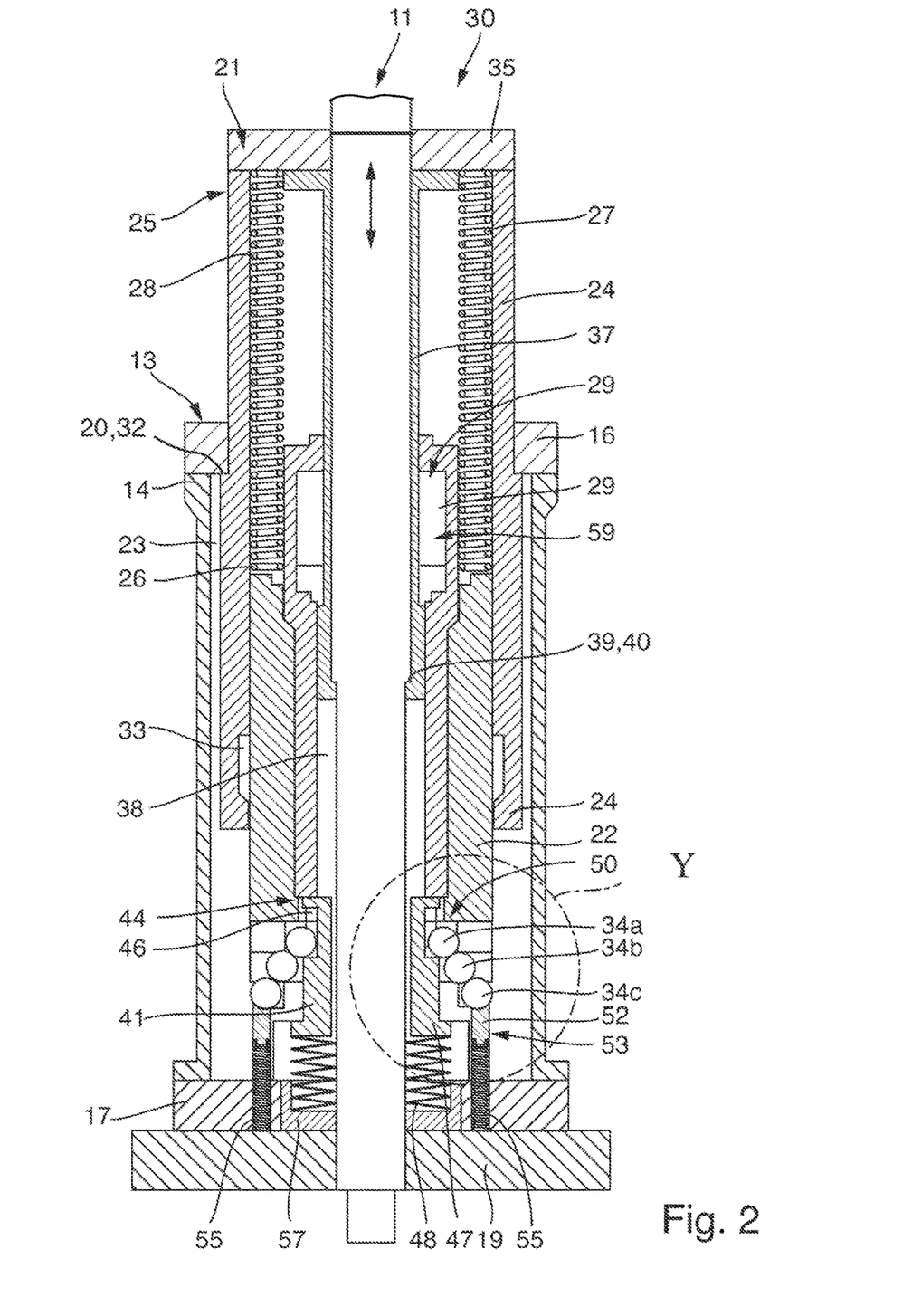
FIG. 2 shows a schematic representation of the safety device of FIG. 1, wherein the blocking unit is in the blocking position when the safety function is triggered.

As shown in FIG. 1 and FIG. 2, the safety device 11 has a housing 13, which is linearly movably penetrated by the coupling rod 12.

The housing 13 has a sleeve-shaped outer section 14, which is equipped with a lower mounting flange 15 at its lower end and with an upper mounting flange 16 at its upper end. The lower mounting flange 15 of the housing 13 is attached to a disc-shaped magnetic housing 17 which also belongs to the housing 13, which magnetic housing 17 accommodates the electromagnet device 18 described below in more detail. The magnetic housing 17 is again connected to a socket flange 19, which is also linearly movably penetrated by the coupling rod 12. The safety device 11 can be mounted via the socket flange 19, for example, to a mounting interface of the valve fitting (not shown) of the valve.

The upper fastening flange 16 forms, in particular with its annular inner shoulder, an upper stop 20 for a blocking unit 21 described in more detail below, which upper stop prevents the blocking unit from extending from out of the housing 13 when the safety function is triggered.

As shown in FIG. 1 and FIG. 2, the housing 13 has an inner housing section 22, which is consecutively enclosed by the housing section 14. The inner housing section 22 is also formed as a sleeve. Between the outer wall of the inner housing section 22 and the inner wall of the housing outer section 14, a ring-shaped clearance 23 is formed, in which an outer sleeve section 24 of a blocking sleeve 25 of the blocking unit 21 is linearly movably accommodated.

The axial extension of the inner housing section 22 is lower than the axial extension of the outer housing section 14. At the sheath surface of the inner housing section 22, a ring shoulder is formed, which forms an abutment area 26 for a spring 27 of a spring device 28, said spring being described in more detail below.

The inner wall of the inner housing section 22 protrudes radially to the outside in the area of its upper end, thereby forming the outer wall of a chamber 29 which is described in more detail below.

As already mentioned, the safety device 11 comprises a blocking unit 21 which is linearly movably penetrated by the coupling rod 12, which blocking unit 21 is relatively movable with respect to the housing 13 between a blocking position 30 blocking a stroke of the coupling rod 12 (FIG. 2) and a release position 31 allowing a linear movement of the coupling rod 12 (FIG. 1).

The main component of the blocking device 21 is a blocking sleeve 25 having the already mentioned outer sleeve section 24, which is accommodated in the space 23 between the inner housing section 22 and the outer housing section 14 such as to linearly pass the outer sleeve section. The outer sleeve section 24 has on its sheath surface a ring shoulder which forms an upper counter-stop 32, which abuts at the upper stop 20 on the housing outer cut 14 when triggering the safety function and thus prevents the blocking sleeve 25 from extending out of the housing. In the area of the lower end of the outer sleeve section 24 of the blocking sleeve 25, there is a ring-shaped receiving chamber 33 at the inner wall, in which a support rolling element 34, which is described in more detail below, is at least partially immersed.

At the top of the blocking sleeve 25, a sleeve flange 35 is attached to the outer sleeve section 24, to which in turn a linear drive can be docked. The sleeve flange 35 further establishes a connection to an inner sleeve section 37 of the blocking sleeve 25. On the inside of the sleeve flange 35, another ring shoulder is formed, which forms a further installation surface 36 for the spring 27 of the spring means 28. The inner sleeve section 37 is linearly movably accommodated in an annular clearance 38 formed by the inner wall of the inner housing section 22 and the outer wall of the coupling rod 12.

As shown in FIG. 1 and FIG. 2, there is a ring shoulder on the coupling rod, which forms a stop 39. The stop 39 on the coupling rod 12 corresponds to a counter-stop 40 on the inner sleeve section 37, which is formed by a final diameter reduction of the through opening of the inner sleeve section 37.

As the summary of FIG. 1 and FIG. 2 shows, the stop 39 and counter-stop 40 are aligned in the release position 31 with axial distance to each other, thereby allowing a stroke movement of the coupling rod 12. In the blocking position 30, which is shown in FIG. 2, the stop 39 on the coupling rod 12 and the counter-stop on the inner sleeve section 37 are in contact with each other, whereby a blockage of the coupling rod 12 is caused, thereby preventing a stroke of the coupling rod 12.

As shown in particular in FIG. 1 and FIG. 2, the outer wall of the inner sleeve section 37 of the blocking sleeve 25 forms the inner wall of the chamber 29 described in more detail below.

The safety device 11 also comprises a locking device 41 for locking the blocking unit 21 in the release position 31, wherein the locking device 41 has locking rolling elements 34a, 34b, 34c accommodated in the housing 13 and one support sleeve 42 which is linearly movably penetrated by the coupling rod 12.

As shown by the summary of FIG. 1 and FIG. 2 as well as 4 and 5, the support sleeve 42 passes movably between a support position 43 (FIG. 1) and a release position 44 (FIG. 2). In the support position 43, the support rolling elements 34a, 34b, 34c are held radially to the outside, engaged in a locked manner with the blocking unit 21 in the locking position 45, while allowing a retracting of the support rolling elements 34a, 34b, 34c radially to the inside out of the locking engagement with the blocking unit 21 in the release position 44.

The support sleeve 42 has a ring-shaped support sleeve reception space 46 on its sheath surface, which space acts together with the receiving space 33 at the sleeve outer section 24 of the blocking sleeve 25 in the release position, such that the annular support sleeve receiving space 46 is facing the annular receiving space 33. At its underside, the support sleeve 42 disc-shaped cover section 47 or impact flange with a larger diameter, compared to the rest of the support sleeve 42, which flange acts together with the trigger springs 48 of a trigger spring device 49, said trigger spring being described in more detail below.

The locking device 41 has a plurality of support rolling element groups 50 grouped around the circumference of the support sleeve 42, each having a plurality of support rolling elements 34a-c, in this exemplary embodiment, three support rolling elements 34a-c. The support rolling elements 34a-c are formed in the exemplary embodiment as support rollers. The support rolling elements 34a-c are arranged successively in the radial direction and therefore have an inner support rolling element 34a, a medium support rolling element 34b and an outer support rolling element 34c for each support rolling element group 50.

As shown in FIG. 2, the support rolling elements 34a-c are successively staggered in the blocking position, also in height direction or axial direction. In any case, the inner support rolling element is immersed in the annular support sleeve receiving space 46 both in the blocking position 30 as well as in the release position 31. However, the outer support rolling element 34c is only immersed in the locking release position in the annular receiving room at the sleeve inner section 37 of the blocking sleeve 25, whereas it is displaced radially to the inside in the blocking position shown in FIG. 2.

The safety device 11 also comprises an electromagnet device 18, which, when energized, holds the support sleeve 42 at the support position 43 contrary to the recoil force of at least one trigger spring 48, such that in the event of a power failure, the holding function can be reversed and the support sleeve 42 can be moved by means of at least one release spring 48 into the release position 44, thereby allowing the blocking unit 21 to be transferred to the blocking position 30 by means of the spring device 28.

In the exemplary embodiment, a plurality of electromagnets 57 are grouped around the coupling rod 12 in the magnetic housing 17, which electromagnets hold, when energized, the support sleeve 42 in the support position 42. When energized, the support sleeve 42 is therefore held in the support position 43, contrary to the spring force of the trigger springs 48.

The trigger spring device 49 has a plurality of trigger springs 48 grouped around the coupling rod 12 which hold the support sleeve in the release position 44 when deactivating the electromagnet device 18. As shown in particular in FIG. 1, several cylindrical receiving spaces grouped around the coupling rod are formed in the magnetic housing, in which the assigned trigger springs 48 are accommodated.

The safety device 11 also includes a retaining device 51 for retaining the support rolling elements 34a-c against movement radially to the outside in the blocking position 30 of the blocking unit 21, when moving the receiving space 33 on the outer sleeve section 24 of the blocking sleeve 25 upwards.

Figure 3:
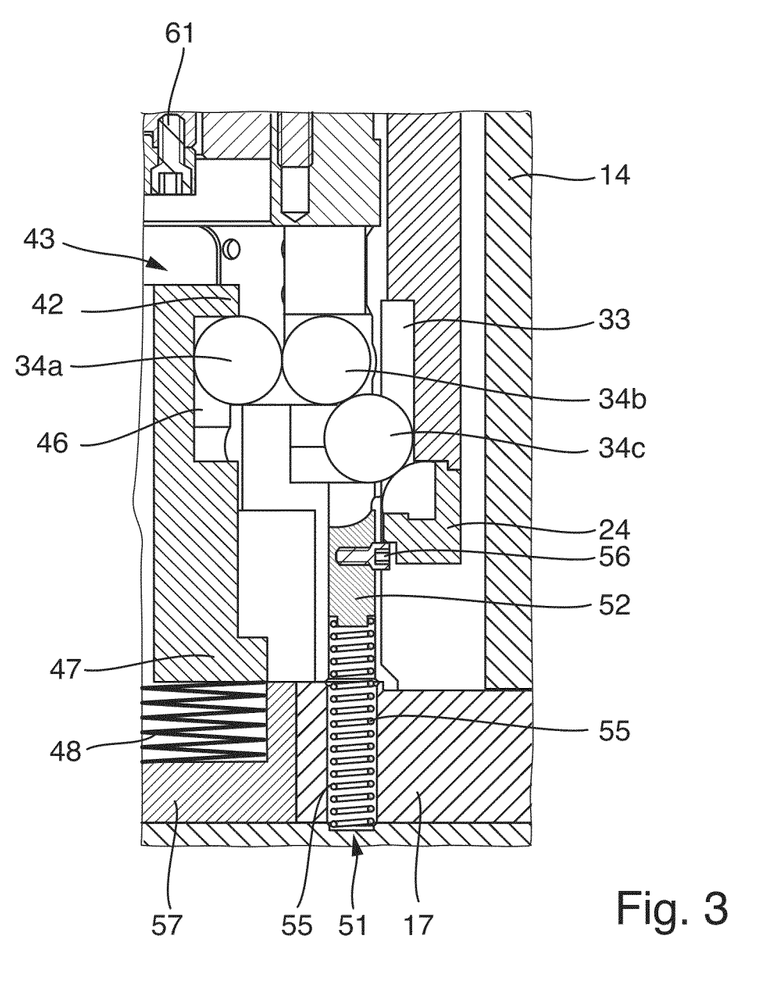
FIG. 3 shows a schematic representation of the detail X from FIG. 1.
Figure 4:
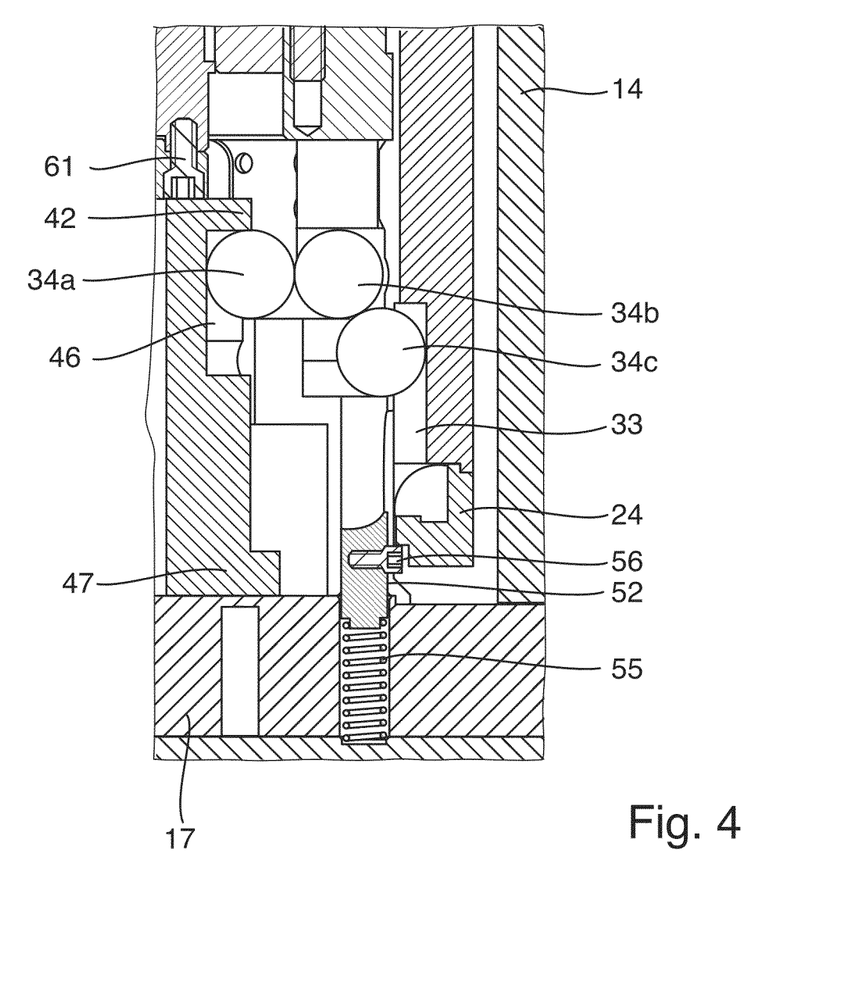
FIG. 4 shows an enlarged representation of the detail X from FIG. 1, when returning the support sleeve from the release position to the support position.
Figure 5:
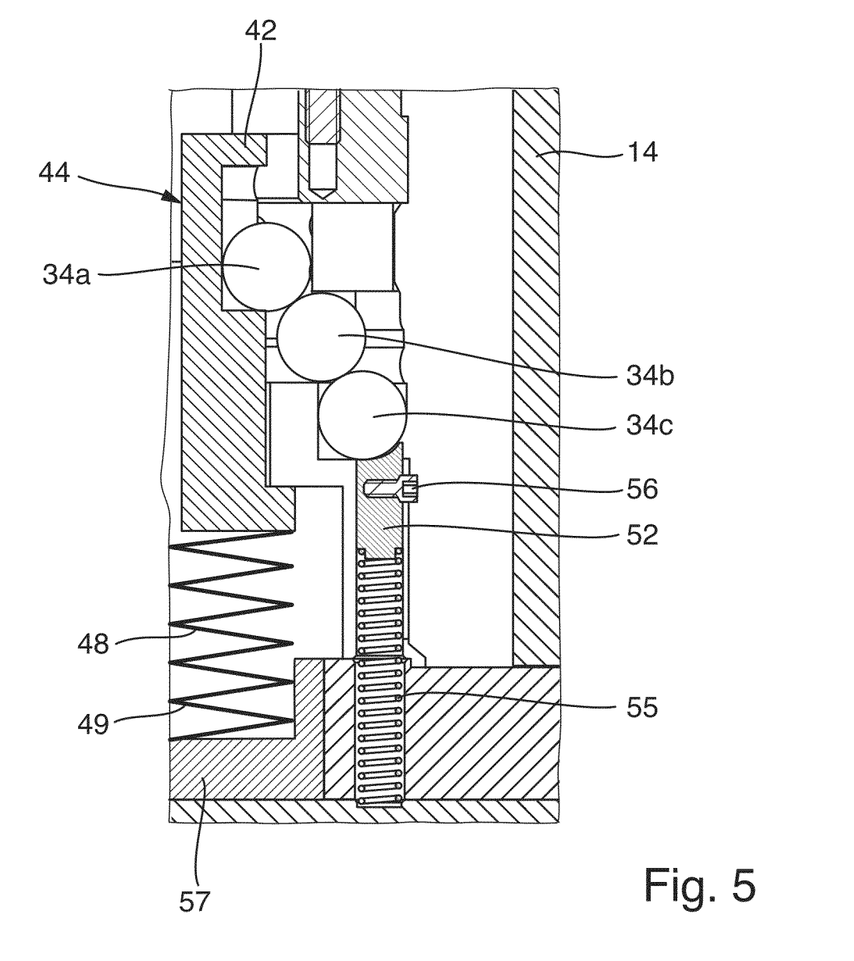
FIG. 5 shows an enlarged representation of the detail Y from FIG. 2

As shown in FIG. 3 to FIG. 5, the retaining device 51 has a retaining member 52 for each support rolling element group 50, which retaining member is movably arranged between a retaining position 53 retaining the assigned support rolling element 34c and a non-use position 54. A recoil spring 55 is assigned to the retaining members 52, which is on the one hand at the bottom of the retaining member 52 and on the other hand is supported on the socket flange 19. As shown in particular in FIG. 3 and FIG. 5, a carrier 56 protruding radially to the outside is provided at the retaining member 52, for example in the form of a screw, which is acted upon by the outer sleeve section 24 when returning the blocking unit from the blocking position 30 to the release position 31, that is, the lower edge of the sleeve section comes into contact with the carrier 56, thereby pressing back the retaining member 52 when in contact with the recoil spring 55. When triggering the safety function, the blocking unit 21 is moved to the blocking position, thereby moving the blocking sleeve 25 upwards, and whereby the recoil spring 55 moves the retaining member 52 such that it is in abutment with the outer support rolling element 34c. The top of the retaining member 52 can be attached to the shape of the attached support rolling element 34c, so as to be adapted, for example, to the cylinder shape of the support roller.

Figure 6:
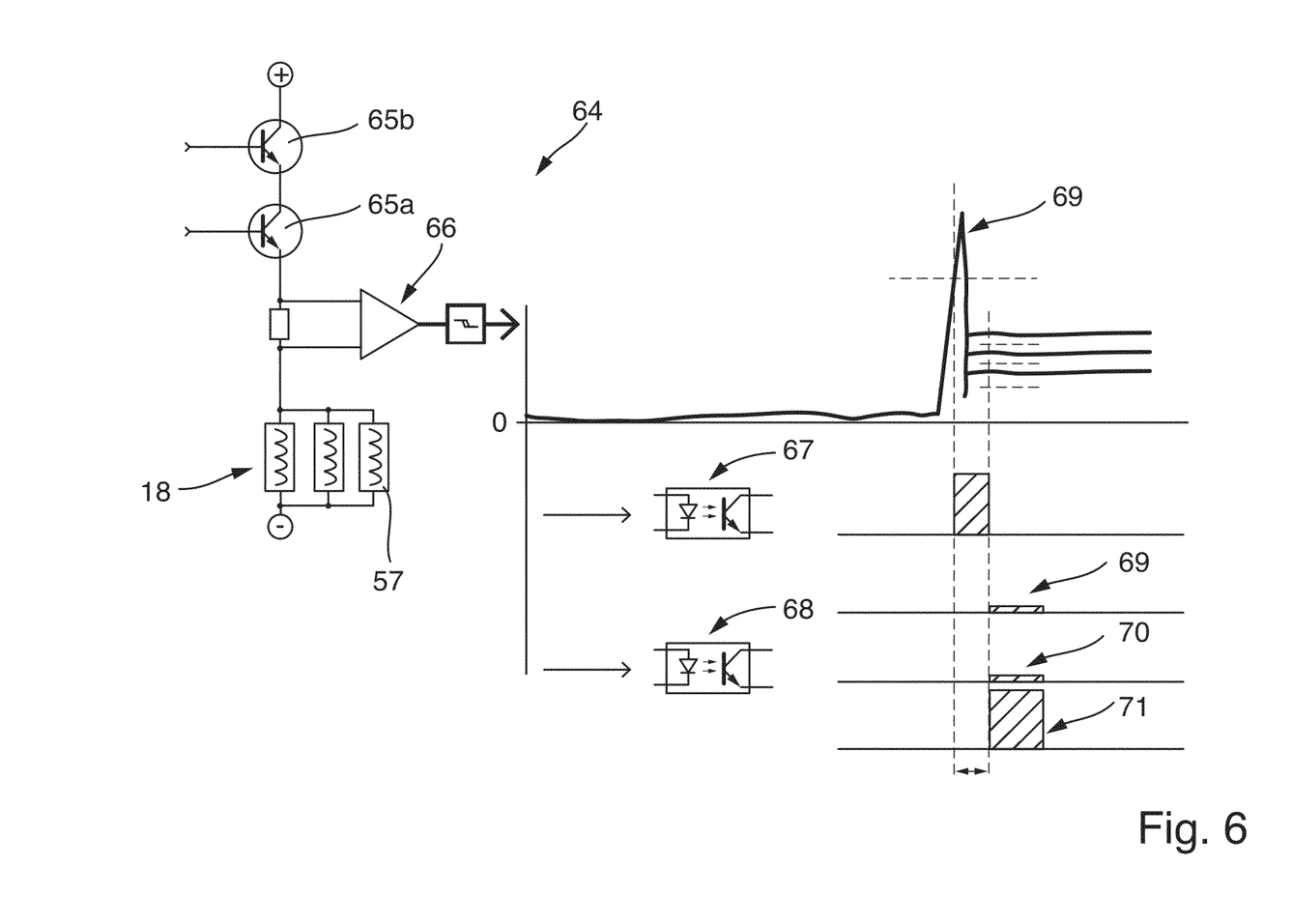
FIG. 6 shows a circuit diagram of an electronic circuit of the electrical interruption (electronic safety solution).

As shown in FIG. 6 by means of a circuit diagram, a position detection device is provided, with which the position of the electromagnets 57 of the electromagnet device 18 can be detected in order to receive feedback on whether the electromagnets 57 are activated, i.e. energized or deactivated. For this purpose, the electromagnets 57 are mounted in the magnetic housing 17 and are supported from the underside by a recoil spring 58 (FIG. 1). In the activated state of the electromagnets 57, the support sleeve 42 is tightened and is located in its support position 43, thereby pushing back the trigger springs 48 and whereby the electromagnets 57 also push back the recoil springs 58. After triggering the safety function, the support sleeve 42 moves away from the electromagnets 57, since the trigger spring 48 press the support sleeve 42 upwards into the release position 44. This allows the recoil springs 58 to push the electromagnets 57 upwards, wherein this position change is detected by means of a position sensor (not shown).

The safety device also includes recoil agents for returning the blocking unit from the blocking position 30 to the release position 31 against the spring force of the spring device 28. In the example shown, the recoil means include an electric recoil drive, for example in the form of a servo motor, which ensures that the blocking sleeve 25 is pushed back against the spring force of the spring 27 of the spring device 28.

The safety device 11 also comprises a damping device 59, which is designed in the example as a hydraulic damping device 59.

As already described above, a chamber 29 is formed by the inner wall of the inner housing section 22 and the outer wall of the inner sleeve section 37, which can be filled with hydraulic oil.

As shown in FIG. 1, a second smaller chamber 60 is formed below the first chamber 29, namely only if the blocking sleeve is in the release position, i.e. the blocking sleeve 25 is retracted and locked. The two chambers 29,60 are interconnected by a throttle (not shown). When triggering the safety function, hydraulic oil is therefore transferred from the second chamber 60 via the throttle into the first chamber 29 which triggers a damping function. The hydraulic oil contained in the first chamber then partially flows into a displacement chamber or equalization chamber (not shown).

In normal operation, the blocking unit 21 is driven in and locked in the release position 31, which is shown in FIG. 1. In the release position 31, the stop 39 and the counter-stop 40 are in the axial direction of each other, thereby allowing a lifting motion of the coupling rod 12 within the resulting stroke. The locking of the blocking unit 21 is achieved by energizing the electromagnets 57. If the electromagnets 57 are activated, i.e. energized, these together hold the support sleeve 42 in the support position 43.

Crucially, the support rolling elements of the support rolling element group 50 are located in the locking position 45. This is achieved by the fact that the ring-shaped support sleeve receiving space 46 and the annular receiving space 33 are opposite each other at the outer sleeve section 34 of the blocking sleeve 25. In this position, the outer support rolling element 34c immerses in the receiving room 33 at the blocking sleeve 25. At the same time, the inner support rolling element 34a is immersed in the annular support sleeve receiving space 46. Although the spring 27 of the spring device 28 strives to push the blocking sleeve 25 out of the housing 13, this is not possible, as the support rolling elements 34a-c are engaged with each other and the outer support rolling element 34*c* prevents the blocking sleeve from passing by said outer support rolling element. The recoil force of the spring 27 has an effect on the outer support rolling element 34*c*, then on the middle support rolling element 34*b* and then on the inner support rolling element 34*a*, which, however, also receives its support, since the support sleeve is tightened and is in the support position 43.

In the event of a power failure, the electromagnets 57 are deactivated, causing their holding force for the support sleeve 42 to be lost.

In this case, the trigger springs 48 presses the support sleeve 42 upwards in its release position 44, as it is shown in FIG. 2. Since the annular support sleeve receiving space 46 has an axial extension that is larger than the axial extension of the inner support rolling elements 34*a*, the support sleeve 42 can move past the inner support rolling element 34*a*. If the support sleeve 42 then comes into contact with the support rolling element 34*a* on the inner ring shoulder of the support sleeve receiving space 46, said support rolling element is moved upwards with the support sleeve 42, thereby creating free space for the middle support-rolling element 34*b*. The middle support rolling element 34*b* can then tilt to some extent radially to the inside, thereby making room for the outer support rolling element 34*c*, which can also move radially to the inside. This reverses the locking of the blocking unit, such that the spring force of the strongly dimensioned spring 27 of the spring device 28 pushes the blocking sleeve 25 upwards out of the housing until the upper counter-stop 32 on the outer sleeve section 24 abuts the upper stop 20 on the outer housing section 14.

At the same time, the retaining device 41 is activated and the retaining members 52 are moved upwards by the recoil springs 55 to the assigned outer support rolling elements 34*c*, thereby holding the outer support rolling element.

When extending the blocking sleeve, the hydraulic oil located in the second chamber 60 is displaced into the first chamber, thereby triggering a damping function which prevents the blocking sleeve from suddenly ejecting as a result of the high spring force of the spring 27 of the spring device 28.

In the blocking system shown in FIG. 2, the blocking sleeve 25 is unlocked and extended from the housing 13. In this state, the counter-stop 40 on the sleeve section 37 of the blocking sleeve 25 abuts the stop 39 arranged at the coupling rod 12, which prevents lifting of the coupling rod 12 downwards. This allows, for example, a coupled valve member to be driven into a defined open position.

The returning of the blocking unit 21 from the block position 30 shown in FIG. 2 to the release position 31 shown in FIG. 1 proceeds as follows:

By means of a servo motor, a force is exerted on the blocking sleeve 25, thereby retracting the blocking sleeve contrary to the force of the spring device 28 into the housing 13. When the blocking sleeve is retracted, the sleeve outer section 24 and also the sleeve inner section 37 are moved downwards.

As shown in particular in FIG. 4, an actuation element 61, which is particularly adjustable in height, is arranged at the bottom of the inner sleeve section 37, for example arranged in the form of a screw, which, when retracting the blocking sleeve, comes into contact, with the upper end of the support sleeve 42, which is still in the release position 44. The actuation element 61 therefore pushes the support sleeve 42 against the spring force of the trigger springs 48 back into the support position 43 and in the range of the magnet attraction of the electromagnets 57, which are activated and hold the support sleeve 42 in the support position 43. At the same time, the retaining members 52 are pressed down by the abutment of the inner edge of the outer sleeve section against the spring for of their recoil springs 55 and the receiving space 33, in the area of the outer sleeve section, comes into the area of the outer support rolling element 34*c*, which then immerses in the annular receiving room 33.

After shifting the support sleeve from its release position 44 to the support position 34, the blocking sleeve 25 can then move upwards to some extent, thereby reaching the support position 45 of the support rolling elements 34*a-c*.

FIG. 6 shows a schematic circuit diagram of an electronic circuit 64 for the control of electronic interrupting (electronic safety solution). The circuit is part of the safety device 11. This is a single transistor circuit, which is fed by the quiescent current of the electric actuator in the form of the servo motor.

The electronic circuit 64 comprises a circuit in which the electromagnetic device 18 is switched on. In the circuit, two switches in the form of transistors 65*a*, 65*b*, in particular npn-transistors, are switched on. The first transistor 65*a* is connected to a higher-level controller, especially a PLC control. If the output is inert, the switch is closed. The second transistor 65*b* is a redundant safety contact. If the output of the second transistor 65*b* is energized, i.e. high, the switch is closed. The electromagnets 57 of the electromagnet device 18 are only activated if the two outputs of the transistors 65*a*, 65*b* are high. The electromagnets 57 are connected in parallel, so that they switch at the same time.

The two output signals are controlled by a current measurement and detection circuit 66. In total, there are two possible situations. The first situation is called SPIKE 67 or peak, the other situation is called ALIVE 68 or error. The situation is SPIKE 67 if a switch-on peak 69 is detected in particular in the form of a 0.5 s high pulse. This is basically independent of the number of actual switching electromagnets 57. Three electromagnets 57 are shown as examples. Of course, it is possible to operate the safety device with more than three parallel connected electromagnets 57.

In particular, the switch-on peak is considerably higher than the rated current. Thus, if the current is well above the normal operating intake, the SPIKE output is, for example, 0.5 s high. A switch-on peak 69 results only if metal is attached to the magnet, i.e. if the electromagnets 57 abut the metal base flange 19 against the spring force of the recoil spring 58. This is the case when the blocking unit 21 is locked (FIG. 1).

The situation is ALIVE 68 (error) if not all electromagnets 57 are activated, for example only one or two or, as shown in the circuit diagram by the reference signs 69 (one not activated magnet) and 70 (two not activated magnets). However, the situation (reference mark 71) can also be detected that, although all three electromagnets 57 are activated, they are not pushed back to their basic position by the recoil force of the recoil spring. In this case, there is no metal attached to the electromagnet 57, but an air gap is formed, so that the measured value of the current is significantly lower. In this case, there is no switch-on peak 69.

What is claimed is:

1. A safety device for detachably locking an output member of a linear drive comprising:
   a coupling rod that can be coupled with the output member of the linear drive, whereby the output member is movable by means of a stroke of the coupling rod,
   a housing penetrated linearly movably by the coupling rod, a blocking unit penetrated linearly movably by the coupling rod which is relatively movable with respect to the housing between a locking position blocking the stroke of the coupling rod and a release position enabling the linear movement of the coupling rod, a spring device for prestressing the blocking unit in the blocking position, a locking device for locking the blocking unit in the release position, wherein the locking device has support rolling elements accommodated in the housing and a support sleeve penetrated linearly movably by the coupling rod wherein the support sleeve is movable between a support position, in which the support rolling elements are held radially to the outside with the blocking unit in locking position and a release position, allowing a retracting of the support rolling elements radially to the inside, out of the engagement with the blocking unit, an electromagnet device which, when energized, holds the support sleeve in the support position against the recoil force of at least one trigger spring of a trigger spring device, in such a way that in the event of a power failure, the holding function can be reversed and the support sleeve is moved to the release position by means of at least the one trigger spring, thereby allowing the blocking unit to be transferred to the blocking position by means of the spring device, wherein a stop on the coupling rod and a counter-stop on the blocking device are formed which are arranged, in the release position, with an axial distance to each other determining the stroke of the coupling rod and abut each other in blocking position resulting in the locking of the output member.

2. The safety device according to claim 1, wherein the blocking unit has a blocking sleeve penetrated by the coupling rod which supports the support rolling elements, in the release position radially to the outside and holds them in the locking position.

3. The safety device according to claim 2, wherein the blocking sleeve has an annular receiving space in which an outer support rolling element is immersed only in the locking position when the blocking sleeve is in the release position, but not when the blocking sleeve is in the blocking position.

4. The safety device according to claim 1, wherein a plurality of support rolling elements groups grouped around the circumference of the support sleeve are provided each having a plurality of support rolling elements arranged successively in radial direction.

5. The safety device according to claim 4, wherein a radial extension of the support rolling elements within each support rolling element group in the radial direction is greater in the locking position than in the release position of the support sleeve.

6. The safety device according to claim 5, wherein the support rolling elements of each support rolling element group in the release position of the support sleeve are staggered in the height direction, wherein the staggering in the height direction causes a reduction of the radial extension.

7. The safety device according to claim 1, wherein the support sleeve has an outer wall on which a support sleeve receiving space is formed which acts together with the receiving space of the blocking unit in the support position, in which support sleeve receiving space a support roller element is immersed both in the support position as well in the release position of the support sleeve.

8. The safety device of claim 7, wherein the inner support roller element can move upwards with the support sleeve when the support sleeve transitions from the support position to the release position, and wherein the inner support roller element can move downwards with the support sleeve when the support sleeve transitions from the release position to the support position when the inner sleeve portion comes in contact with the upper end of the support sleeve.

9. The safety device according to claim 1, wherein the support rolling elements are formed cylindrically.

10. The safety device according to claim 1, wherein the electromagnet device has a plurality of electromagnets formed around the coupling rod which hold the support sleeve together in the support position when energized.

11. The safety device according to claim 1, wherein the release spring device has a plurality of release springs grouped around the coupling rod which together move the support sleeve into the release position when deactivating the electromagnetic device.

12. The safety device according to claim 1, wherein the blocking sleeve has an inner sleeve section formed with the counter-stop, which inner sleeve section surrounds the coupling rod concentrically and which is immersed in an annular space between a cylindrical inner housing section of the housing and the coupling rod, and wherein the blocking sleeve has an outer sleeve section, which surrounds the inner housing section concentrically and wherein, at its inner wall, the receiving space for the locking rolling elements is formed.

13. The safety device according to claim 1, wherein recoil means are provided for returning the blocking unit against the spring force of the spring device from the blocking position to the release position.

14. The safety device according to claim 13, wherein the recoil means have a mechanical, fluid or electrical recoil drive for returning the blocking unit in the release position.

15. The safety device of claim 14, wherein the recoil drive is formed as a servo motor.

16. The safety device according to claim 1, wherein a retaining device is provided for retaining the support rolling elements against the movement radially to the outside in the blocking position of the blocking unit.

17. The safety device according to claim 16, wherein the retaining device has a retaining member assigned to a radially outer support rolling element of each respective support-rolling element group, which retaining member is movable between a retaining position retaining the assigned support rolling element and a non-use position.

18. A drive unit comprising a linear drive and the safety device according to claim 1.

19. A process valve comprising a valve fitting and the drive unit according to claim 18.

20. A safety device for detachably locking an output member of a linear drive comprising:

a coupling rod that can be coupled with the output member of the linear drive, whereby the output member is movable by means of a stroke of the coupling rod, a housing penetrated linearly movably by the coupling rod, a blocking unit penetrated linearly movably by the coupling rod which is relatively movable with respect to the housing between a locking position blocking the stroke of the coupling rod and a release position enabling the linear movement of the coupling rod, a spring device for prestressing the blocking unit in the blocking position, a locking device for locking the blocking unit in the release position, wherein the locking device has support rolling elements accommodated in the housing and a support sleeve penetrated linearly movably by the coupling rod wherein the support sleeve is movable between a support position, in which the support rolling elements are held radially to the outside with the blocking unit in locking position and a release position, allowing a retracting of the support rolling elements radially to the inside, out of the engagement with the blocking unit, an electromagnet device which, when energized, holds the support sleeve in the support position against the recoil force of at least one trigger spring of a trigger spring device, in such a way that in the event of a power failure, the holding function can be reversed and the support sleeve is moved to the release position by means of at least the one trigger spring, thereby allowing the blocking unit to be transferred to the blocking position by means of the spring device, wherein a plurality of support rolling elements groups grouped around the circumference of the support sleeve are provided each having a plurality of support rolling elements arranged successively in radial direction, and wherein a radial extension of the support rolling elements within each support rolling element group in the radial direction is greater in the locking position than in the release position of the support sleeve.

21. The safety device according to claim 20, wherein the support rolling elements of each support rolling element group in the release position of the support sleeve are staggered in the height direction, wherein the staggering in the height direction causes a reduction of the radial extension.

22. The safety device according to claim 20, wherein the support sleeve has an outer wall on which a support sleeve receiving space is formed which acts together with the receiving space of the blocking unit in the support position, in which support sleeve receiving space a support roller element is immersed both in the support position as well in the release position of the support sleeve.

23. The safety device of claim 22, wherein the inner support roller element can move upwards with the support sleeve when the support sleeve transitions from the support position to the release position, and wherein the inner support roller element can move downwards with the support sleeve when the support sleeve transitions from the release position to the support position when the inner sleeve portion comes in contact with the upper end of the support sleeve.

24. The safety device according to claim 20, wherein a retaining device is provided for retaining the support rolling elements against the movement radially to the outside in the blocking position of the blocking unit.

25. The safety device according to claim 24, wherein the retaining device has a retaining member assigned to a radially outer support rolling element of each respective support-rolling element group, which retaining member is movable between a retaining position retaining the assigned support rolling element and a non-use position.

26. The safety device according to claim 20, wherein a stop on the coupling rod and a counter-stop on the blocking device are formed which are arranged, in the release position, with an axial distance to each other determining the stroke of the coupling rod and abut each other in blocking position resulting in the locking of the output member.

27. The safety device according to claim 2, wherein the blocking sleeve has an inner sleeve section formed with the counter-stop, which inner sleeve section surrounds the coupling rod concentrically and which is immersed in an annular space between a cylindrical inner housing section of the housing and the coupling rod, and wherein the blocking sleeve has an outer sleeve section, which surrounds the inner housing section concentrically and wherein, at its inner wall, the receiving space for the locking rolling elements is formed.

28. A safety device for detachably locking an output member of a linear drive comprising:
a coupling rod that can be coupled with the output member of the linear drive, whereby the output member is movable by means of a stroke of the coupling rod,
a housing penetrated linearly movably by the coupling rod,
a blocking unit penetrated linearly movably by the coupling rod which is relatively movable with respect to the housing between a locking position blocking the stroke of the coupling rod and a release position enabling the linear movement of the coupling rod,
a spring device for prestressing the blocking unit in the blocking position,
a locking device for locking the blocking unit in the release position, wherein the locking device has support rolling elements accommodated in the housing and a support sleeve penetrated linearly movably by the coupling rod wherein the support sleeve is movable between a support position, in which the support rolling elements are held radially to the outside with the blocking unit in locking position and a release position, allowing a retracting of the support rolling elements radially to the inside, out of the engagement with the blocking unit,
an electromagnet device which, when energized, holds the support sleeve in the support position against the recoil force of at least one trigger spring of a trigger spring device, in such a way that in the event of a power failure, the holding function can be reversed and the support sleeve is moved to the release position by means of at least the one trigger spring, thereby allowing the blocking unit to be transferred to the blocking position by means of the spring device,
wherein a retaining device is provided for retaining the support rolling elements against the movement radially to the outside in the blocking position of the blocking unit; and
wherein the retaining device has a retaining member assigned to a radially outer support rolling element of each respective support-rolling element group, which retaining member is movable between a retaining position retaining the assigned support rolling element and a non-use position.

29. A safety device for detachably locking an output member of a linear drive comprising:
a coupling rod that can be coupled with the output member of the linear drive, whereby the output member is movable by means of a stroke of the coupling rod,
a housing penetrated linearly movably by the coupling rod,
a blocking unit penetrated linearly movably by the coupling rod which is relatively movable with respect to the housing between a locking position blocking the stroke of the coupling rod and a release position enabling the linear movement of the coupling rod, a spring device for prestressing the blocking unit in the blocking position, a locking device for locking the blocking unit in the release position, wherein the locking device has support rolling elements accommodated in the housing and a support sleeve penetrated linearly movably by the coupling rod wherein the support sleeve is movable between a support position, in which the support rolling elements are held radially to the outside with the blocking unit in locking position and a release position, allowing a retracting of the support rolling elements radially to the inside, out of the engagement with the blocking unit, an electromagnet device which, when energized, holds the support sleeve in the support position against the recoil force of at least one trigger spring of a trigger spring device, in such a way that in the event of a power failure, the holding function can be reversed and the support sleeve is moved to the release position by means of at least the one trigger spring, thereby allowing the blocking unit to be transferred to the blocking position by means of the spring device, wherein the support sleeve has an outer wall on which a support sleeve receiving space is formed which acts together with the receiving space of the blocking unit in the support position, in which support sleeve receiving space a support roller element is immersed both in the support position as well in the release position of the support sleeve; and wherein the inner support roller element can move upwards with the support sleeve when the support sleeve transitions from the support position to the release position, and wherein the inner support roller element can move downwards with the support sleeve when the support sleeve transitions from the release position to the support position when the inner sleeve portion comes in contact with the upper end of the support sleeve.

\* \* \* \* \*